Patented May 22, 1928.

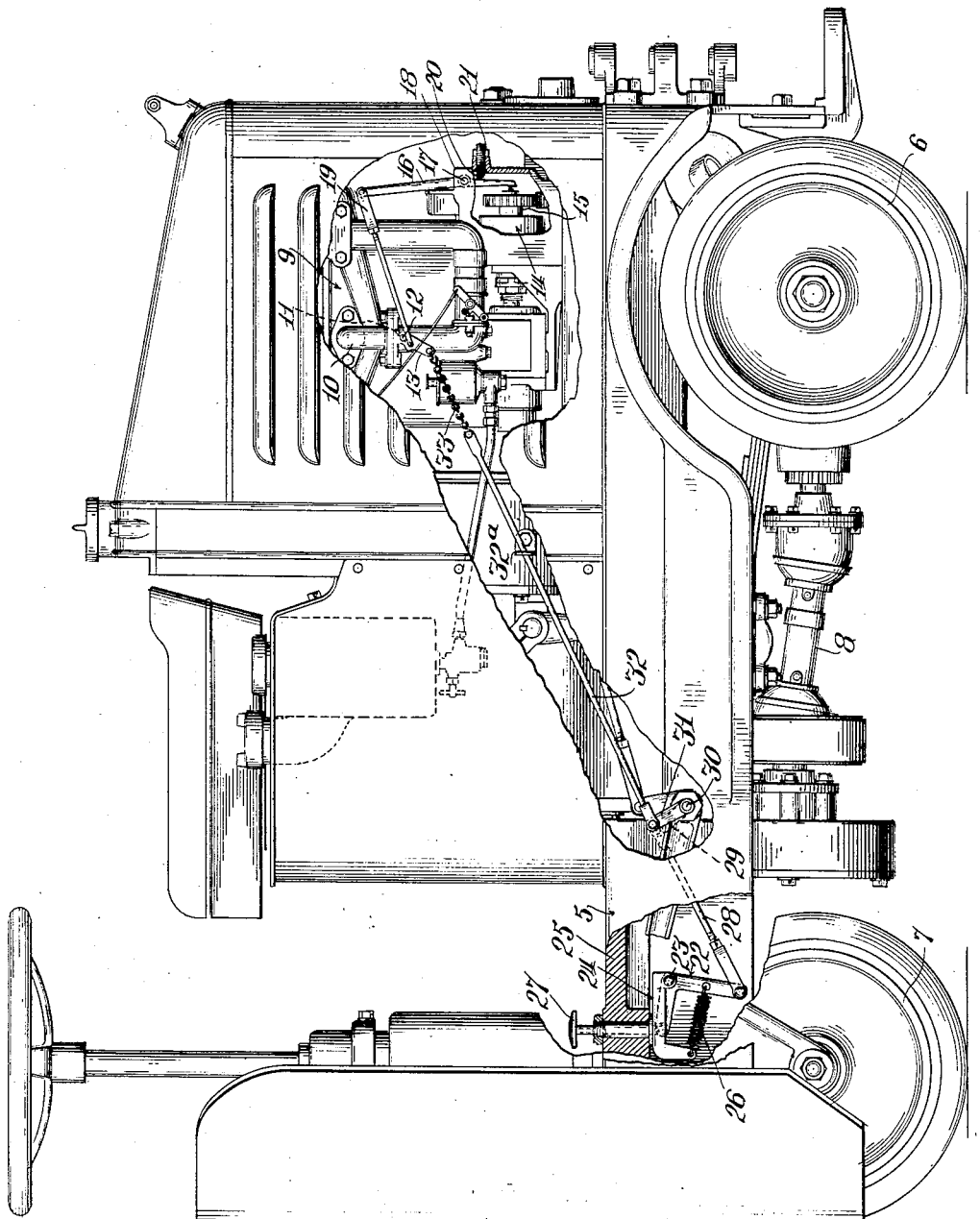

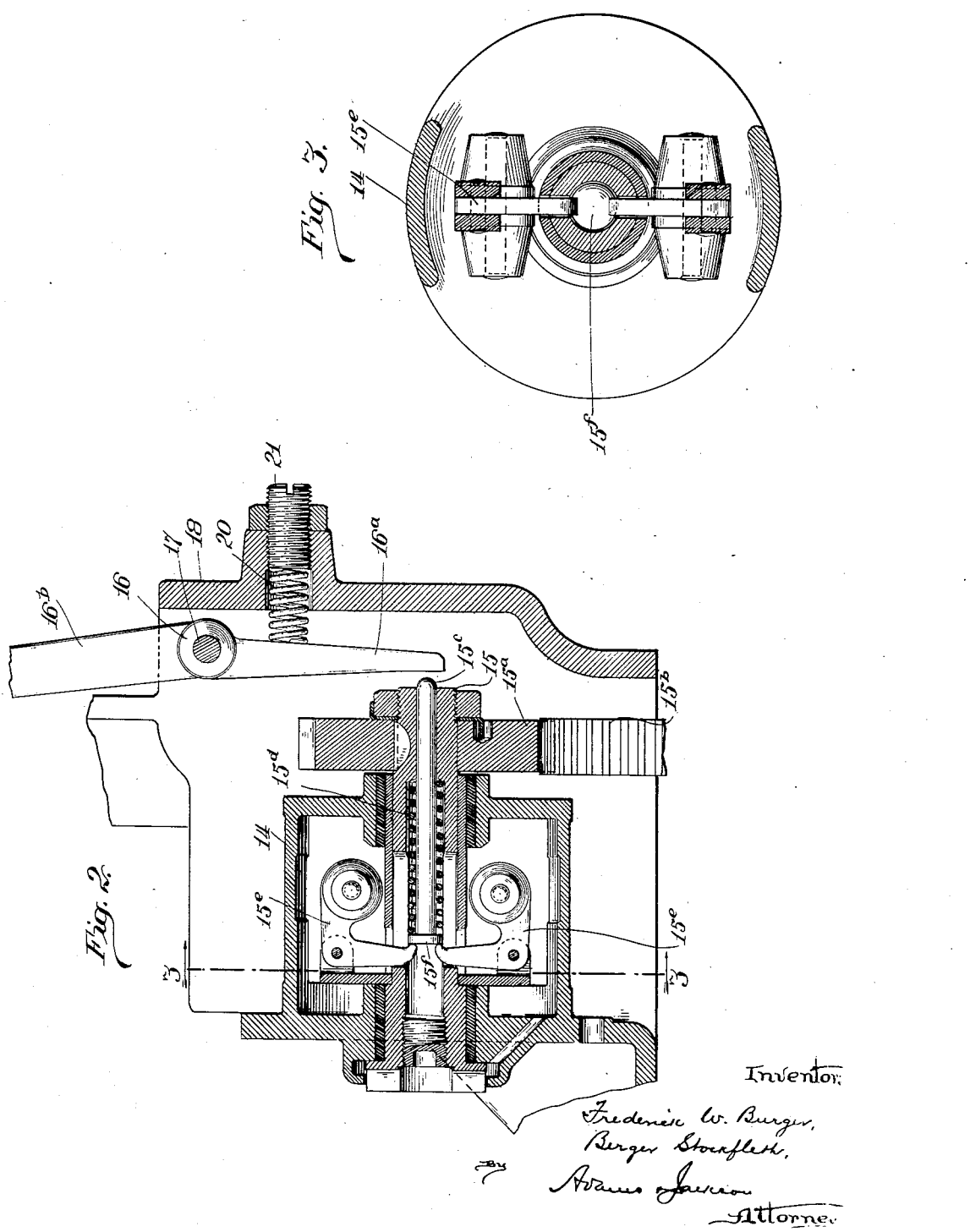

1,670,567

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

THROTTLE-VALVE CONTROLLING MECHANISM.

Application filed January 22, 1924. Serial No. 687,732.

This invention relates to motor vehicles of the type employing an internal combustion engine as the motive power, and while primarily designed for use in connection with that type of vehicle that is known as a shop tractor and is used in and about shops, railway stations and other places for pulling or pushing from place to place trucks employed in transporting articles of various sorts is not necessarily limited to use with that particular type of motor vehicle. The object of the invention is to provide novel, cheap, and simple means extending from the throttle valve of the engine to a point within convenient reach of the operator of the vehicle and adapted normally, or, when not actuated by the operator, to move such valve toward its closed position and hold it against movement in the opposite direction, but which when moved by the operator—as by pressure applied to a foot lever or treadle—will freely permit the throttle valve to be controlled by a governor in the usual manner. This object we accomplish by the means shown in the drawing and hereinafter particularly described. That which we believe to be new will be set forth in the claims.

In the drawings Figure 1 shows in side elevation, with some portions broken away, a well-known type of shop tractor provided with our improvements; Figure 2 is a partial longitudinal vertical sectional view showing the type of governor we prefer to use, and Figure 3 is a cross-section on line 3—3 of Fig. 2. Referring to the drawings, 5 indicates the frame of the chassis which is supported upon a pair of rear wheels and a front dirigible wheel, that one of the rear wheels that shows in Fig. 1 of the drawing being indicated by 6 and the front wheel being indicated by 7. Upon the frame 5 is a housing which encloses the motor and other operating parts, and connection is made from such motor by any suitable means to the forward portion of a sectional propeller shaft, indicated generally by 8, whereby said shaft is driven, and, through its connection with the rear axle by means of an ordinary differential mechanism, the tractor is propelled. Inasmuch as the parts thus far briefly referred to form no part of our invention, and, indeed, may be of any usual construction, it is not deemed necessary to enter into a more detailed description thereof.

Referring now to the parts to which the invention more particularly relates,—9 indicates generally an internal combustion motor and 10 the manifold through which gas is conducted to the engine. An ordinary throttle valve, indicated in dotted lines at 11, is provided in said manifold, the stem 12 thereof being journaled in the side walls of the manifold and having secured upon a projecting end thereof an arm 13, by the turning of which the said valve may be turned to the desired position.

As is common practice, there is provided in connection with the throttle valve a governor for effecting automatic regulation of such valve, which governor may be of any well-known type. The casing of the governor that we have chosen to illustrate is indicated by 14, and the governor comprises a hollow shaft 15 on the end of which is secured a gear $15^a$ that meshes with another gear $15^b$ fast on a shaft driven by the engine. In such governor a plunger rod $15^c$ is adapted to be moved longitudinally in the bore of the hollow shaft 15, it being forced outward or to the right as seen in Fig. 2, against the action of a spring $15^d$ by increase of speed so that its end will project beyond the end of such shaft, such outward movement being caused by the centrifugal action of weighted arms $15^e$ pivotally connected with said hollow shaft and bearing against a collar or abutment $15^f$ on said rod—all as is well understood.

In connection with the governor, governor controlled throttle-valve actuating devices are provided, comprising a lever 16, which, in the construction shown, is pivotally supported at 17 on a bracket 18 or other suitable support, the lower and shorter arm $16^a$ of such pivoted lever lying opposite the end of the shaft 15 so that as the plunger rod $15^c$ in said shaft is projected such rod will rock said lever in a counter-clockwise direction as viewed in Fig. 2. Pivotally connected to the upper end portion $16^b$ of the lever 16 is a link 19 that at its other end is suitably connected with the arm 13 that is connected with the stem of the throttle valve. At 20 is indicated a coiled spring that bears against the lower arm 16ª of the lever 16 and tends to move it inward, and consequently to move the upper arm 16ᵇ of said lever outward, or to the right as seen in the drawings, so that said spring tends to open the throttle valve, and to hold the lever arm 16ª in contact with the proximate end of rod 15ᶜ. When the speed of the engine increases, obviously the consequent projection of said rod overcomes said spring and rocks the lever 16 in a direction to close the valve. An adjusting screw plug 21 is provided for regulating the force which the spring 20 exerts against the lever.

Referring now to the means that extend from the throttle valve to a point within convenient reach of the operator while on the seat of the vehicle, and which normally tend to move the throttle valve toward closing position, but are subject to control by the operator,—22 indicates a bell-crank lever pivoted at 23 to a bracket 24 fixedly secured below the platform 25 at the front of the machine. One of the arms of said bell-crank extends downward, and extending between the down-turned arm of said bell-crank and a down turned forward end portion of the bracket 24 is a strong coiled spring 26 that tends to swing said arm forward and upward. At 27 is indicated a vertically-movable pedal suitably mounted in an opening through the platform 25 and bearing at its lower end against the other arm of the bell-crank, which extends forward, as shown in Fig. 1 said pedal being adapted, when pushed down by the operator, to swing the bell-crank on its pivot against the force of the spring 26, as will be readily understood. Extending rearwardly from the downwardly-extending arm of the bell-crank, and pivotally connected therewith, is a link 28 which at its other end is pivotally connected with a crank that is indicated in dotted lines by 29, which link is fast on a rock-shaft 30 that is journaled in the frame of the vehicle, and upon which shaft are mounted other operating parts that have no direct relation with the present invention, and, therefore, are not herein described. At 31 is shown another crank that is secured to said rock-shaft, and projecting rearwardly and upwardly from this last-named crank is a connection that extends between the latter crank and the arm 13 that is on the stem of the throttle valve. Such connection comprises a relatively long link 32 that at its forward end is pivotally attached to the crank 31, and a flexible member that is here shown as a chain and is indicated by 33—the chain being interposed between and connected to the said arm 13 and the link 32. A supporting bracket 32ª is provided for the link 32, through an eye in which said link passes.

With the parts constructed and arranged as described, and with no downward pressure being exerted upon the pedal 27, the effect of the coiled spring 26 will be to pull the downturned arm of the bell-crank 22 forward and upward, and through the parts interposed as described between said arm and the throttle valve arm 13 will, as will be readily understood, cause a turning of the throttle valve toward its closing position. This will pull the upper arm 16ᵇ of the lever 16 forward, and move its lower arm 16ª rearward against the force of the spring 20, which is sufficiently weaker than the spring 26 to readily permit of this movement. The parts may, of course, be adjusted so that the throttle valve will not be entirely closed but will be left open only sufficiently to admit just enough gas to keep the engine running while the vehicle is stationary. Under the conditions described obviously the rod 15ᶜ will be withdrawn from engagement with the lever arm 16ª. When, however, the pedal is pressed down the bell-crank will be rocked against the force of the coiled spring 26, with the effect of causing the flexible member 33 to assume a slack condition. Such slackening of the flexible member releases the forward pull on the throttle valve arm 13 and therefore permits the spring 20 to rock the lever 16 so as to open the throttle valve, under control of the governor which can then function as usual, and, through the described connections between it and said arm 13, maintain the throttle-valve in position to keep the engine running at the desired speed under varying load conditions, as usual.

By providing connecting means between the foot pedal 27 and the throttle valve, that comprises as one of its elements a flexible member, such as the chain 33, which is normally held taut to hold the throttle valve closed, or approximately so, and may be slackened at will by the operator to permit the governor controlled valve actuating devices to function, we have provided a construction that is very effective to prevent the engine from running at high speed unnecessarily, and yet does not in the least interfere with proper functioning of the governor when the power of the engine is being used. Moreover, because of its simplicity it may be cheaply and readily installed.

What we claim as our invention and desire to secure by Letters Patent, is—

1. In a motor vehicle, the combination of a motor, a throttle valve therefor, a governor driven by the motor, devices controlled by the governor and adapted to actuate said valve to govern the engine speed, means normally operating to move said valve toward its closed position notwithstanding action in opposition thereto by the governor controlled devices, and means, under the control of the operator, operable to render said first named means temporarily inoperative while leaving said valve free for control by the governor.

2. In a motor vehicle, the combination of a motor, a throttle valve therefor, a governor driven by the motor, devices controlled by the governor and adapted to actuate said valve to govern the engine speed, means normally operating to move said valve toward its closed position notwithstanding action in opposition thereto by the governor controlled devices, comprising a normally taut flexible connection, and means, under the control of the operator, operable to slacken said connection, to leave said valve free for control by the governor.

3. In a motor vehicle, the combination of a motor, a throttle valve therefor, a governor driven by the motor, devices controlled by the governor and adapted to actuate said valve to limit the engine speed to a predetermined maximum, means normally operating to move said valve toward its closed position notwithstanding action in opposition thereto by the governor controlled devices, comprising a flexible connection connected with said valve, a spring operating to hold said connection normally taut, and means, under the control of the operator, operable to slacken said connection, to leave said valve free for control by the governor.

4. In a motor vehicle, the combination of a motor, a throttle valve therefor, a governor driven by the motor, devices controlled by the governor and adapted to actuate said valve to limit the engine speed to a predetermined maximum, means normally operating to move said valve toward its closed position notwithstanding action in opposition thereto by the governor controlled devices, comprising a flexible connection connected at one end with said valve, a lever connected with the other end of said connection, a spring connected with said lever for holding said connection normally taut, and means operable to actuate said lever to slacken said connection, to leave said valve free for control by the governor.

5. In a motor vehicle, the combination of a motor, a throttle valve therefor, a governor driven by the motor, governor controlled valve actuating devices comprising a lever arranged to be actuated by increase of the engine speed to close said valve, a connection between said lever and said valve whereby by actuating said lever said valve may be adjusted, and a spring tending to actuate said lever to open said valve, means normally operating to move said valve toward its closed position notwithstanding action in opposition thereto by the governor controlled devices, and means under the control of the operator, operable to render said first named means temporarily inoperative to move said valve towards its closed position.

6. In a motor vehicle, the combination of a motor, a throttle valve therefor, a governor driven by the motor, governor controlled valve actuating devices comprising a lever arranged to be actuated by increase of the engine speed to close said valve, a connection between said lever and said valve whereby by actuating said lever said valve may be adjusted, and a spring tending to actuate said lever to open said valve, means normally operating to move said valve toward its closed position notwithstanding action in opposition thereto by the governor controlled devices, comprising a normally taut flexible connection operating when taut to hold said valve from being opened by the action of said spring, and means, under the control of the operator, for slackening said flexible connection to leave said valve free for control by the governor.

7. In a motor vehicle, the combination of a motor, a throttle valve therefor, a governor driven by the motor, governor controlled valve actuating devices comprising a lever arranged to be actuated by increase of the engine speed to close said valve, a connection between said lever and said valve whereby by actuating said lever said valve may be adjusted, and a spring tending to actuate said lever to open said valve, means normally operating to move said valve toward its closed position notwithstanding action in opposition thereto by the governor controlled devices, comprising a flexible connection, a spring for moving and holding said flexible connection in opposition to said first-mentioned spring, and means, under the control of the operator, operable to slacken said flexible connection, to leave said valve free for control by the governor.

8. In a motor vehicle, the combination of a motor, a throttle valve therefor, a governor driven by the motor, governor controlled valve actuating devices comprising a rod movable endwise by variation in the engine speed, a lever associated with said rod to be actuated thereby by increase of the engine speed, a connection between said lever and said valve whereby by actuating said lever said valve may be adjusted, and a spring tending to actuate said lever to open said valve, means normally operating to move said valve toward its closed position notwithstanding action in opposition thereto by the governor controlled devices, comprising a flexible connection serving when taut to hold said valve from opening under the action of said spring, a spring for holding said flexible connection normally taut, and means, under the control of the operator, operable to slacken said flexible connection, to leave said valve free for control by the governor.

9. In a motor vehicle, the combination of a motor and a throttle valve therefor, of a first spring operatively connected to said valve and tending to move said valve towards its open position, a governor operatively connected to oppose the action of said first spring at predetermined engine speeds, a second spring, connecting means between said second spring and said valve, said second spring normally tending to move said valve towards its closed position and preponderating over said first spring in its action on said valve, said connecting means comprising a lost motion connection through which said second spring transmits its stress to said valve, and an operator's control member arranged to overcome the stress of said second spring normally transmitted through said lost motion connection to thereby partially or entirely liberate said valve from the controlling influence of said second spring.

10. In a motor vehicle, the combination with a motor and a throttle valve therefor, of a first spring operatively connected to said valve and tending to move said valve towards its open position, a centrifugal governor operatively connected to oppose the action of said first spring at predetermined engine speeds, a second spring, connecting means between said second spring and said valve, said second spring normally tending to move said valve towards its closed position and preponderating over said first spring in its action on said valve, said connecting means comprising a lost motion connection through which said second spring transmits its stress to said valve, and an operator's control member arranged to overcome the stress of said second spring to thereby relieve said lost motion connection from the stress of said latter spring in order that said valve can be operated by said first spring.

FREDERICK W. BURGER.
BERGER STOCKFLETH.